Patented July 16, 1940

2,207,723

UNITED STATES PATENT OFFICE 2,207,723

GLAZE FOR CERAMIC DECORATION

Alden J. Deyrup, Elizabeth, N. J., assignor to E. I. du Pont de Nemours & Company, Wilmington, Del., a corporation of Delaware No Drawing. Application February 26, 1936, Serial No. 65,935. Renewed October 23, 1939

2 Claims. (Cl. 106—36.2)

This invention relates to the decoration of ceramic surfaces such as surfaces of metal, glass, china, tile, porcelain, terra cotta and similar ceramic objects. More particularly, the invention is concerned with a low melting glaze or enamel which is usually pigmented in order that various colors may be imparted to the article to be coated. My novel glaze has been found especially suitable for decorating the surfaces of vitrified articles such as those formed of glass or china.

Pigmented glazes, which are also termed fluxes and enamels, have been used in the decoration of glassware and other ceramic bodies for a number of years. It has been the usual practice to employ as the glaze or flux composition a low melting glass such as one comprising lead borosilicates. Such glasses are usually made by melting together an oxide of lead, boric acid, and silica in such proportions as to yield a glass which has a suitable low melting point. While the glass is still molten it is poured into water, which operation is called fritting. The comminuted glaze or flux is then ground to a suitable fineness and a pigment which is usually a metallic compound is added after fritting or during the grinding operation.

In use, such lead borosilicate glazes are suspended in a suitable medium and applied to the glass or ceramic surface which is to be decorated. Among such media are mixtures of turpentine and balsam of copaiba in various proportions, and various other media now also in commercial use. The usual ways of applying the glaze or flux composition to the surface to be decorated include brushing, spraying and even in some cases printing directly on the ceramic surface to be decorated.

After application of the glaze composition the coated ceramic article is fired, and it is essential that the pigmented glaze melt at a temperature which is sufficiently low so that deformation of the ceramic or glass body coated will be avoided. Since the pigmented glaze must melt before the glass or other object being coated reaches a temperature sufficiently high to cause softening or deformation, the importance of the glazes or fluxes having low melting points will be apparent. It is for this reason that the industry has generally used lead borosilicate glazes, as with soft glazes of this composition the melting point, even after the addition of the pigment, is still sufficiently low to permit the composition to melt without any danger of the glass article being coated becoming damaged thru softening.

However, the lead borosilicate glazes have been generally unsatisfactory for the reason that they do not possess sufficient resistance to chemical action. Such glazes are very easily attacked by dilute acids and alkalies and are even soluble to some extent in water. This means that during washing operations, or for any use in which the glaze comes in contact with a dilute acid or dilute alkali, the glossy appearance is attacked and removed. If the contact with the acid or alkali is sufficiently prolonged the colored coating will be entirely removed from the article.

One of the objects of this invention is to prepare suitable glazes or flux compositions which may be pigmented, and applied to a glass surface. When the glass is fired at a temperature of 1000 to 1100° F. for periods of from 5 to 20 minutes these improved glaze compositions will melt and impart a glossy decorated surface to the article coated. It is therefore another of the objects of this invention to prepare glazes which when applied to glass or ceramic objects to be coated will melt at a temperature below that at which any softening or deformation of the article to be coated will occur.

A further object of this invention is to prepare a glaze composition which when fired on a body to be coated will result in a coating having a glossy surface which possesses improved resistance to the action of dilute acids and alkalies. Of course, it is also an object of this invention to obtain glazes which are much less water-soluble than those now in use. These and still further objects of this invention will be apparent from the ensuing disclosure, which is the best method known to me for preparing and applying these improved glaze compositions.

I have found that the use of bismuth compounds, such as bismuth oxide, or a compound which will yield bismuth oxide such as bismuth subnitrate, in flux compositions results in low melting glazes having certain improved properties. The presence of bismuth usually increases the resistance of these low melting glazes to chemical action, decreases the tendency of the applied coating to craze or crack, and tends to prevent devitrification. Moreover, the presence of bismuth decreases the melting point and results in compositions which melt at temperatures so low that they may be readily employed for coating glass objects without any danger of softening or deformation. The improved resistant vitrifiable glass colors, which form the subject matter of this invention, contain bismuth oxide or a compound which will result in or be equivalent to bismuth oxide when it is melted with the other ingredients of the flux.

As an indication of the resistant properties of the new glazes containing bismuth it may be stated that they are practically insoluble in both hot and cold water. I have soaked specimens of these glazes in 5% acetic acid solutions for periods up to 24 hours with only very slight decrease in the glossiness of the coating. Furthermore, I have found that objects coated with my improved glaze compositions may be immersed in 3% sodium hydroxide solutions at elevated temperatures such as 85° C. for periods of time of 6 hours or more with but little or no attack of the surfaces.

The resistant properties of my new glazes containing bismuth may be contrasted with those of the glazes of low melting point now available to the ceramic industry. The glazes now known to the art, consisting essentially of lead borosilicate bases, are strongly attacked by dilute acetic acid and by solutions of sodium hydroxide.

My improved glazes can be prepared by melting together a lead compound such as lead oxide, silica and a bismuth compound such as bismuth oxide. If desired an alkali metal oxide such as sodium oxide ($Na_2O$), potassium oxide ($K_2O$), or lithium oxide ($Li_2O$), may be present. I have found that improved results are obtained by the presence of an alkali metal compound, such as one of the oxides specified, in addition to the compound of bismuth.

As the lead compound I have found red lead and lead nitrate especially suitable. Other compounds of lead, such as white lead and litharge which are equivalent to those specified and which will yield lead oxide when melted together with the other ingredients comprising the flux may be used. As the source of silica I have used both sand and flint. Other convenient sources of silica, such as quartz, may also be used. As the bismuth compound I have found especially suitable bismuth oxide and bismuth subnitrate. Other compounds of bismuth may also be used, as bismuth hydroxide and bismuth subcarbonate. As the alkali metal compounds various oxides, carbonates, nitrates and hydroxides of lithium, sodium and potassium may be utilized. Other salts or compounds of the elements lead, bismuth, alkali metal and silicon may be substituted for the compounds specifically mentioned, in accordance with the common practice in the glass-making and ceramic arts. In the ceramic art metallic nitrates, carbonates, hydroxides and other metallic compounds in which the acid radical is volatile at red heat under the action of non-volatile acidic materials such as silica, are substantially equivalent to the metal oxides. Similarly $PbO_2$, $Pb_3O_4$ and $PbO$ are equivalents within the contemplation of this invention because the first two oxides decompose to yield the latter at temperatures below red heat.

The melting together of the components comprising the glaze need not be carried out under any definitely fixed conditions of temperature or time of heating. It is necessary only to bring the mixture to its melting point and to hold it at that temperature for a period of time of sufficient duration so that the components will react and form a molten glass which is reasonably free from bubbles due to decomposition of any of the constituent parts. Ordinarily a temperature of 800° to 1100° C. will be suitable for melting the flux ingredients.

After melting, the molten glaze is fritted by pouring it into water. This disintegrates the mass and makes it possible to grind it more easily. Instead of water any convenient inert, clean surface may be used, in which case the glaze should preferably be crushed before grinding.

After fritting, the glaze is ground in a ball mill for a period of time sufficient to reduce it to a finely comminuted powder. Ordinarily I have found it convenient to place 100 grams of the glaze mixed with pigment in a one pound ball mill containing one pound of stones and about 40 cc. of water. Under these conditions about 12 hours grinding is necessary to mix the pigment and glaze thoroughly and produce a pigmented composition of the desired fineness for spraying, brushing or printing.

It should be remembered that the pigment is added to the fritted glaze either prior to or during the milling step. Any well known ceramic pigment may be introduced into the improved glazes by grinding and, as specific examples of such pigments, lead antimoniate and cobalt aluminate may be mentioned. The former will give a yellow composition when fired, while the latter will give a blue. Black and other colored ceramic oxides may also be introduced. If white coatings are desired, pigments such as titanium dioxide, vanadium pentoxide and molybdenum trioxide may be introduced either by addition to the raw glaze batch or to the fritted glaze. Metallic compounds such as cadmium oxide and lead chromate may also be employed as pigmenting materials and added either to the raw glaze batch or to the fritted glaze.

The exact proportion of pigment to be added to the glaze will depend, in general, upon the color which is desired. Ordinarily I have found that between 1 to 20% of pigment, these amounts being by weight, based upon the total weight of the composition, will be suitable. It should be borne in mind that my invention does not depend upon the particular pigment added nor upon the particular amount of the pigment, but is concerned solely with the improved low melting glaze or flux compositions. As previously stated, any pigment may be introduced by milling it into the fritted glaze during the grinding operation and the particular pigment introduced forms no part of my invention.

As examples of my improved glazes containing bismuth compunds such as bismuth oxide or a compound which will yield or is equivalent to bismuth oxide during the process of melting, the following may be given:

EXAMPLE 1

The following ingredients, the parts being by weight, are melted together at a temperature of 800 to 1000° C.

```
                                          Parts
Soda ash ($Na_2CO_3$)_____ 50
Bismuth subnitrate ($BiONO_3.H_2O$)_____ 20
Red lead ($Pb_3O_4$)_____ 390
Flint ($SiO_2$)_____ 165
```

When the molten mixture has ceased to froth and while still molten it is poured into water. To this coarsely fritted glass a black ceramic oxide in the proportions of 10 parts of oxide to 90 parts of coarse glaze was added. The mixture was then milled with 40% of its weight of water for a period of time sufficient to reduce it to a fine powder. A ball mill was used for this purpose and about 12 hours grinding was sufficient. The product was then suspended in a suitable vehicle and applied to the glass surface which was to be coated. After heating to a temperature of about 1030° F. for a period of from 10 to 15 minutes, the pigmented flux melted and formed a shiny, firmly adherent black glaze on the object.

A suitable black ceramic oxide may be prepared by milling and calcining the following ingredients, the calcining being carried out at about 1100° C:

| | Parts |
|---|---|
| Black cobalt oxide ($Co_3O_4$) | 30 |
| Chromic oxide ($Cr_2O_3$) | 35 |
| Ferric oxide ($Fe_2O_3$) | 35 |

EXAMPLE 2

The following ingredients, the parts being by weight, were fused together at a temperature of 800 to 1000° C.

| | Parts |
|---|---|
| Red lead ($Pb_3O_4$) | 91 |
| Bismuth subnitrate | 30 |
| Flint ($SiO_2$) | 30 |

When the molten mixture had ceased to froth it was poured into water. To the coarsely fritted glass resulting, lead antimoniate yellow pigment in the amount of 10 parts of pigment to 90 parts of coarse glass may be added. The mixture may be thoroughly milled in a ball mill until reduced to the desired fineness.

The pigmented glaze is then suspended in a vehicle consisting essentially of 90% turpentine and 10% balsam of copaiba. It is applied to the surface of a glass article to be coated by spraying and the glass article is then heated to a temperature of about 1030° F. for a period of from 10 to 15 minutes. A shiny, firmly adherent yellow coating results.

As illustrations of the proportions of the various ingredients used in preparing my novel glazes the following tabular summary may be given:

Table I

| Ingredient | Glaze comprising PbO, $Bi_2O_3$, $SiO_2$ and $R_2O$ | Glaze comprising PbO, $Bi_2O_3$ and $SiO_2$ |
|---|---|---|
| Lead oxide | 30 to 45 | 30 to 55 |
| Silica | 50 to 65 | 45 to 60 |
| Alkali metal oxide | 5 to 20 | |
| $Bi_2O_3$ | 0.2 to 10 | 0.2 to 10 |

In this table $R_2O$ represents potassium oxide, sodium oxide or lithium oxide, or any mixture of two or all three of the oxides of these metals. It is thus possible to use a mixture of potassium and sodium oxides, or a mixture of the oxides of lithium and sodium, or any other mixture of two oxides or even a mixture of all three oxides. The figures given in this table are mole-per cent. This means that to determine the amount by weight of any one of these ingredients the numerical value given in the column is multiplied by the molecular weight of the particular oxide. Merely for the purpose of rendering this table more useful, the following approximate molecular weights may be given for various compounds which may be used:

Table II

| Compound | Molecular weight |
|---|---|
| PbO | 223 |
| $SiO_2$ | 60 |
| $Na_2O$ | 62 |
| $K_2O$ | 94 |
| $Li_2O$ | 23 |
| $Bi_2O_3$ | 466 |

It should be understood, of course, that when any metallic compound is used as a source of the metal oxide the amounts should be based on the number of moles of the oxide to which one mole of the metallic compound is equivalent. Thus one mole of sodium nitrate, $NaNO_3$, is equivalent to but half a mole of $Na_2O$. This may be stated in another way, that is the mole-per cents should be based on the oxides out of which the melted glaze is composed, rather than on the basis of the raw constituents put together without any correction for the number of moles of oxide which one mole of the metallic compound will yield.

It is to be understood that various changes may be made in the procedures and proportions heretofore given which will still fall within the scope of my invention. As previously pointed out, my invention resides essentially in the discovery that a compound of bismuth, such as bismuth trioxide, when present in glaze compositions comprising silica, and an oxide of lead, results in glazes or enamels which possess improved properties. In addition to the bismuth compound an alkali metal oxide may also be present. Thus various changes might be made in the particular compositions herein disclosed as illustrative which would still fall within the limits of my broad discovery. Accordingly, the scope of my invention is to be determined in accordance with the appended claims and is not to be regarded as restricted to any particular composition or to any particular mode of treatment.

I claim:

1. A glaze for decorating ceramic surfaces having a maturing temperature below about 1100° F. comprises an oxide of lead in amounts ranging from 30 to 45 mole per cent, silica in amounts ranging from 50 to 65 mole per cent, an oxide of bismuth in amounts ranging from 0.2 to 10 mole per cent, and an oxide selected from the group which consists of sodium oxide, potassium oxide and lithium oxide in amounts ranging from 5 to 20 mole per cent, all these amounts being by weight based on the weight of the glaze.

2. A glass article decorated with a low melting resistant glaze having a maturing temperature below about 1100° F., said glaze comprising an oxide of lead in amounts ranging from 30 to 45 mole per cent, silica in amounts ranging from 50 to 65 mole per cent, an oxide of bismuth in amounts ranging from 0.2 to 10 mole per cent, and an oxide selected from the group which consists of sodium oxide, potassium oxide and lithium oxide in amounts ranging from 5 to 20 mole per cent, all these amounts being by weight based on the weight of the glaze.

A. J. DEYRUP.